United States Patent [19]

De Groef

[11] 3,995,964

[45] Dec. 7, 1976

[54] HEAT RECOVERABLE ARTICLE

[75] Inventor: Pierre De Groef, Brussels, Belgium

[73] Assignee: N.V. Raychem S.A., Kessel-lo, Belgium

[22] Filed: Sept. 8, 1975

[21] Appl. No.: 611,490

[30] Foreign Application Priority Data

Sept. 6, 1974 United Kingdom ............. 39125/74

[52] U.S. Cl. ................................. 403/272; 403/28; 403/273; 174/DIG. 8; 174/88 R; 339/DIG. 1

[51] Int. Cl.² ........................................ H02G 15/08

[58] Field of Search ............ 403/28, 273, 272, 305, 403/300; 174/DIG. 8, 88 R; 339/DIG. 1, 275 R

[56] References Cited

UNITED STATES PATENTS

| | | | |
|---|---|---|---|
| 2,867,680 | 1/1959 | Stecher | 403/305 X |
| 3,243,211 | 3/1966 | Wetmore | 403/282 X |
| 3,316,343 | 4/1967 | Sherlock | 403/272 X |
| 3,525,799 | 8/1970 | Ellis | 174/DIG. 8 |
| 3,678,174 | 7/1972 | Ganzhorn | 174/DIG. 8 |

FOREIGN PATENTS OR APPLICATIONS

| | | | |
|---|---|---|---|
| 321,223 | 11/1929 | United Kingdom | 174/88 |

*Primary Examiner*—Andrew V. Kundrat
*Attorney, Agent, or Firm*—Lyon & Lyon

[57] ABSTRACT

Herein is described an article for encapsulating in separate compartments a plurality of elongate substrates. Typically the substrates comprise the union or junction between pair of electrical conductors or similar structures. The article comprises a heat recoverable outer tubular member and an inner spacer member to divide the space within the outer member into separate compartments. In particularly preferred embodiments, the article also comprises a fusible insert which will melt when the outer member is heated to cause its recovery. The fusible member can flow about the substrate. If the fusible member comprises, for example, solder, the article can be employed to simultaneously incapsulate and form a secure electrical connection between electrical conductors at their union.

19 Claims, 7 Drawing Figures

HEAT RECOVERABLE ARTICLE

FIELD OF THE INVENTION

This invention relates to heat recoverable articles and more especially to heat-recoverable articles provided with means for making electrical connections.

BACKGROUND OF THE INVENTION

In U.S. Pat. No. 3,243,211, there are disclosed numerous heat recoverable articles including generally tubular heat-shrinkable articles having fusible inserts of various types. Examples of fusible inserts are thermoplastic polymeric materials and meltable inorganic materials, for example solder, and numerous devices constructed in accordance with the above patent, the disclosure of which is incorporated by reference herein, are available commercially.

Typical of such devices are a heat-shrinkable tube having disposed within it a ring of solder, and a similarly equipped tube also having at or near each end a ring of fusible polymeric material. When either of the devices is installed by heat-shrinking over, for example, a pair of conductors to be joined, the tube shrinks and the solder melts, simultaneously forming a secure electrical connection between the conductors and completing the insulation of the joint. If the article is provided with polymeric rings, these melt and form an effective means of preventing moisture ingress and reinforce the shrinking ends of the tube in preventing escape of solder from the desired area.

Commercially available articles constructed as above are, of course, only able to join a single pair of conductors within each tubular sleeve. When a plurality of pairs of conductors are to be connected, they are each connected within their own individual sleeve.

There are occasions, however, where it is desirable that a single sleeve should be used to encapsulate the junction between two or more pairs of conductors. Such an arrangement may save space in confined situations and it may allow shorter installation time. More significantly, however, it may be electrically more satisfactory in connecting conductors to be used for high frequency applications, since it allows the impedence of the junction to approach more closely that of the cable. For example, certain types of telephone cable for use in pulse code modulation transmission contain four conductors, arranged, and dimensioned to have an impedence of 75 ohm, and the nearer the impedence of the junction to this value the better.

Accordingly, it is an object of this invention to provide improved means for encapsulating a plurality of elongate substrates.

Another object of this invention is to provide means for making electrical connections between plural pairs of electrical conductors that also isolates individual pairs.

These and other objects will be apparent to those skilled in the art in view of the following description of the invention.

SUMMARY OF THE INVENTION

The present invention provides an article comprising a hollow heat-shrinkable tubular member open at least at one end having within its interior a spacer, the spacer serving to divide the interior of the heat recoverable article into a plurality of compartments adapted to receive a substrate. The spacer is substantially infusible at the temperature at which the outer member is heated to cause its shrinkage. In presently preferred embodiments, the article further comprises a fusible insert that melts and flows under the influence of the heat employed to shrink the outer member. A portion of the fusible insert is located within each compartment defined by the outer member and spacer. A particularly useful insert comprises solder. Articles having solder as a fusible insert can be employed to form secure electrical connections between plural pairs of electrical conductors.

DETAILED DESCRIPTION OF THE INVENTION

Figure 1:
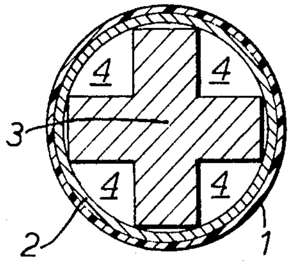
FIG. 1 depicts an article according to the present invention in a cross-sectional view perpendicular to its longitudinal axis.

In a particularly preferred embodiment, the invention provides an article comprising a heat-shrinkable tubular outer member having at least one end, preferably both ends, open, an insert comprising a coaxial ring of fusible material positioned against a portion of the interior surface of the article, and a coaxial spacer, of material infusible at the shrinkage and fusion temperature(s) of the article and ring, that longitudinally divides at least a portion of the interior of the article into at least two compartments, a portion of the fusible ring being in or on the circumferential boundary of each of the compartments.

Preferably, the present invention provides a heat-shrinkable tube having a coaxial solder ring as an insert positioned against its interior wall in a central region thereof and a spacer that divides at least the central region into at least two, preferably four, compartments, the ring surrounding the spacer, whereby on heating to cause shrinkage of the tube and melting of the solder about a plurality of pairs of electrical conductors to be connected, portions of the solder are directed into each compartment.

The spacer may be a thin strip, positioned longitudinally within the tubular article, to divide it into two portions; it may be a strip having the cross-section of a, preferably regular, polygon, e.g., an equilateral triangle, a square, or a pentagon, or it may have any constant or varying cross-section along its length. However, for articles having 3 or more compartments it is preferred to employ as the spacer, a member having a plurality of arms which with the outer member define the compartments. For example, an article having 4 compartments can be obtained using an spacer in the form of a cross or a four-pointed star, the free ends of the cross or points of the star being relatively narrow to avoid "dead spaces" between the compartments. Such spacers, of course, divide the article into four compartments; appropriate corresponding shapes are also preferred for other numbers of compartments.

The spacer may extend for the whole of the length of the article, or it may extend only partway to the or each open end. It will normally have a length greater than that of the fusible insert, which is preferably centered on the mid-point of the article.

The insert may be of any fusible material preferably one which is capable of making electrical connections by melting and contacting the conductors in the compartments, for example solder. It has surprisingly been found that a solder ring positioned continuously around the spacer can, on heating, separate to form a plurality of connections isolated from one another so that there is no conductive path between them.

Articles constructed according to the invention accordingly are particularly suited for use as a method and means whereby a cable comprising a plurality of conductors can readily be joined to another similar length of cable, or terminated, e.g., to a connector block, if desired by an impedance-matched connection.

Many materials are suitable for the various portions of the article. For the heat-shrinkable member, there may be used any material to which the property of heat-recoverability can be imparted, for example, polymeric materials e.g., polyethylene, polybutene, ethylene copolymers (with, e.g., vinyl acetate and ethyl acrylate) polyvinylidene fluoride, polyvinyl chloride, polytetrafluoroethylene; elastomeric materials, e.g., polybutadiene, silicones, or blends of any two or more materials, crosslinked where necessary, by radiation or by chemical means, and rendered heat-recoverable as described for example, in U.S. Pat. Nos. 2,027,961, 2,027,962 and 3,086,242, the disclosures of which are incorporated herein by reference.

For the fusible insert for use in making electrical connections, a meltable conductive material is advantageous and a form of solder is preferred, for example Sn63 (i.e., an alloy of 63% tin, 37% lead), preferably containing or having a quantity of flux. In other applications other fusible materials may be employed.

The spacer may be of any material of suitably elevated softening point. For the making of electrical connections, it should be an insulator or at least have an insulating surface. A high-melting or thermoset polymer is preferred, for example cross-linked polyvinylidene fluoride or polytetrafluorethylene. The spacer may be extruded or machined in the appropriate cross-section and cut to length as desired, or it may be molded as such.

The materials of the spacer and the heat-shrinkable article may have any of the usual additives, for example, flame retardants, antioxidants, fillers, pigments etc. A thermochromic material may be present in the article to indicate when it has been sufficiently heated.

The article may contain more than one spacer and/or more than one insert. The article may also comprise spacers and inserts of two or more different types or shapes. It may especially comprise a fusible insert, preferably polymeric, at the or each open end, as described above.

The invention therefore provides a method of forming connections, especially electrical connections, by shrinking an article constructed in accordance with the invention over a plurality of bodies, especially electrical conductors, positioned within the article, and a connection made by the method.

The invention will now be described in greater detail, by way of example only, with reference to the accompanying drawings.

Figure 3:
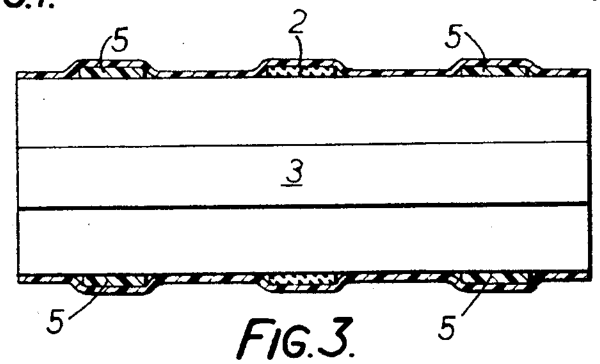
FIG. 3 is a side view in partial cross-section of the article of FIG. 1 along its longitudinal axis.

Referring now to FIGS. 1 and 3, a heat-shrinkable tube 1 of, for example, polyvinylidene fluoride, has at its mid-point a ring of solder 2. Extending along its length, or in the modification in FIG. 6, over its central region is a spacer 3, of four-armed cruciform cross-section, which divides the central section of the interior of the tube 1 into four spaces or compartments 4.

Toward each open end of the tube 1 is a tubular fusible polymeric material 5, made of, for example, polyethylene.

Figure 4:
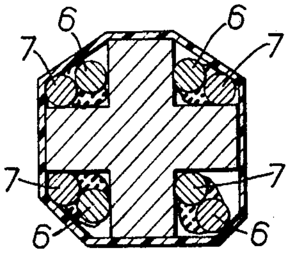
FIGS. 4 and 5 are views of the articles of FIGS. 1, 2 and 3 respectively after heat treatment.
Figure 6:
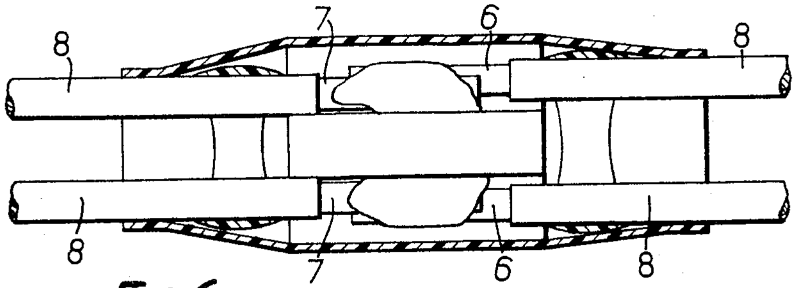
FIG. 6 shows a modification of an article as shown in FIG. 1, after shrinking.

In use, referring now more especially to FIGS. 4 and 6, the ends of four conductors 6, from which the insulation 8 has been removed, of a first telephone cable (not shown) are inserted, one into each space 4, from one open end of the tube 1, while the ends of four conductors 7 of a second cable (not shown) are inserted from the other end. The assembly is then heated; the heat causes the tube 1 to shrink, the solder 2 to melt and flow away from its original ring positioning to wet and bond the conductors 6, 7 and the fusible material 5 to melt and flow around the insulation 8 of the conductors, to seal the assembly against moisture ingress.

Figure 2:
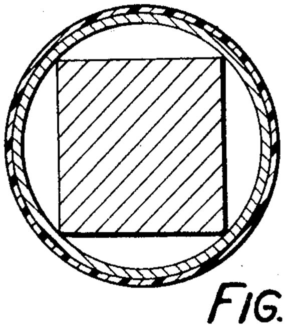
FIG. 2 is a view like that of FIG. 1 for a similar article.
Figure 5:
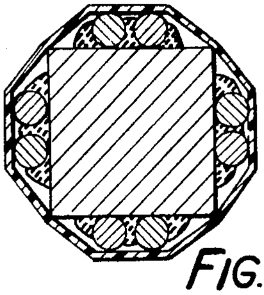

Referring now to FIGS. 2 and 5, a similar tube 1 and solder ring 2 to those described above are employed; the sole difference being the shape of the spacer 9, which is this case is of square cross-section.

Figure 7:
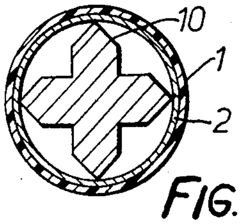
FIG. 7 shows a variation of the article of FIG. 1.

Referring now to FIG. 7, an article similar to that shown in FIG. 1 is illustrated, the sole difference being that the ends of the arms of the spacer 3 are machined or molded to reduce the cross-section or their extremities 10 to points.

Articles constructed in accordance with the invention may be used for a variety of applications, for example, there may be installed in one or both end regions of a tubular article further inserts in the form of electrical components to enable connections to be made with a variety of other devices, for example, there may be positioned at one end in ech compartment a connector pin or socket. The connector is so arranged as to be soldered to a conductor inserted from the other end of each compartment thus providing a simple pin, socket, or if desired, mixed connecting device.

By such devices electrical cables may be terminated simply to a printed circuit board.

Articles constructed in accordance with the invention may also be combined with further articles to make more complex connectors, for example, an article as illustrated in FIG. 3 of the accompanying drawings may be combined with some of the devices constructed in accordance with our copending U.S. Ser. No. 452128 the disclosure of which is incorporated by reference. Thus the inner conductors of four coaxial cables may be combined to those of four further coaxial cables by a device constructed in accordance with the present invention. The outer shields of all of the cables may then be joined by the device disclosed in our above mentioned copending application for the connection of shields.

The following example illustrates the invention. An article was constructed in accordance with FIG. 7 of the accompanying drawings. The outer tube 1 had an overall length of 15 mm and an inner diameter of about 6 mm. The tube comprises polyvinylidene fluoride. A polytetrafluoroethylene spacer of length about 17 mm was provided. Four 20 gage solid pre-tinned conductors were inserted from each end of the sleeve. The assembly was then heated to shrink the sleeve and cause the solder to melt. The breakdown voltage between adjacent pairs of conductors after soldering was 8,000 v and between opposite pairs of conductors it was 10,000 v. Failure was caused in each case at the wire insulation.

I claim:

1. An article for simultaneously joining individual pairs of plural substrates and encapsulating the resulting joints comprising:

a. a heat shrinkable outer tubular member having at least one open end, b. an inner spacer dividing the interior of the tubular member into a plurality of longitudinal compartments adapted to receive a pair of the substrates being joined and segregate said pair from other pairs, said spacer being infusible at the temperature at which a tubular member is heated to cause shrinkage, and c. a fusible insert adapted to flow into each of said compartments and join the substrates in said compartment when the outer member is heated to cause its shrinkage.

2. An article according to claim 1 wherein said spacer has the cross-section of a regular polygon.

3. An article according to claim 1 wherein said spacer has a plurality of arms, said arms and the inner wall of said outer member defining the compartments.

4. An article according to claim 1 wherein said spacer is a strip dividing said interior into 2 compartments.

5. An article according to claim 1 wherein said spacer is coterminus with said outer member.

6. An article according to claim 1 having two open ends wherein the long axis of said spacer is centered at the midpoint of the axis of the outer member.

7. An article according to claim 2 wherein the fusible insert is a ring coaxial with the outer member positioned between the corner of the regular polygon and the outer member.

8. An article according to claim 3 wherein the fusible insert is a ring coaxial with the outer member positioned between the ends of the arms of the spacer and the outer member.

9. An article according to claim 1 wherein the fusible insert comprises solder.

10. An article according to claim 6 wherein said insert is a ring coaxial with the outer member and centered at the midpoint of the axis of the outer member.

11. An article according to claim 6 wherein said insert and said spacer terminate short of each open end of said outer member.

12. An article according to claim 11 that further comprises a ring of polymeric material located within and coaxial with said outer member between each open end and the corresponding end of said spacer adapted to melt when the article is heated to cause shrinkage about an inserted substrate and thereafter when the article is cool seal the ends of the outer member.

13. An article comprising:

a. A heat shrinkable outer tubular member having at least one open end and b. An inner spacer member, said spacer dividing the interior of the tubular member into a plurality of longitudinal compartments adapted to receive an elongate substrate, wherein said spacer has the cross-section of a regular polygon.

14. An article according to claim 13 wherein said spacer has the cross-section of a square.

15. An article according to claim 13 wherein said spacer is coterminus with said outer member.

16. An article according to claim 13 having two open ends wherein the long axis of said spacer is centered at the mid-point of the axis of the outer member.

17. An article according to claim 13 wherein said spacer terminates short of each open end of said outer member.

18. An article according to claim 13 that further comprises a ring of polymeric material located within and coaxial with said outer member between each open end and the corresponding end of said spacer adapted to melt when the article is heated to cause shrinkage about an inserted substrate and thereafter when the article is cool seal the ends of the outer member.

19. An article for simultaneously making secure electrical connections between plural pairs of conductors and encapsulating the resulting conductors comprising:

a. a heat shrinkable outer tubular member open at both ends, b. a spacer member that divides the interior of said outer member into a plurality of longitudinal compartments equal in number to the number of pairs of conductors to be joined, each compartment adapted to receive an end of each member of a conductor pair by insertion through opposite ends of said outer member and separate said pair from other pairs, said spacer being infusible at the temperature which the tubular member is heated to cause shrinkage, and c. a fusible insert ring comprising solder disposed between said outer member and said spacer adapted to flow into each compartment when the article is heated to cause shrinkage of said outer member and thereby contact and form an electrical connection between the end of said members of said conductor pairs.

* * * * *